US006595465B2

(12) United States Patent  
Lamothe

(10) Patent No.: US 6,595,465 B2
(45) Date of Patent: Jul. 22, 2003

(54) TURN BAR ASSEMBLY FOR REDIRECTING A CONTINUOUS PAPER WEB

(75) Inventor: Richard P. Lamothe, Burlington, CT (US)

(73) Assignee: Energy Saving Products and Sales Corp., Burlington, CT (US)

( * ) Notice: Subject to any disclaimer, the term of this patent is extended or adjusted under 35 U.S.C. 154(b) by 0 days.

(21) Appl. No.: 09/950,522

(22) Filed: Sep. 10, 2001

(65) Prior Publication Data

US 2003/0047643 A1 Mar. 13, 2003

(51) Int. Cl.$^7$ .............................................. B65H 23/32
(52) U.S. Cl. ................................ 242/615.21; 226/196.1
(58) Field of Search ........................... 242/615.1, 615.2, 242/615.21; 226/189, 196.1

(56) References Cited

U.S. PATENT DOCUMENTS

| 1,610,671 | A | * | 12/1926 | Funk ..................... 242/615.21 |
| 2,760,773 | A | * | 8/1956 | Brodie .................... 226/196.1 |
| 3,206,089 | A | * | 9/1965 | Huck ................ 242/615.21 X |
| 3,679,116 | A | * | 7/1972 | Hamlin et al. ...... 242/615.21 X |
| 3,734,487 | A | * | 5/1973 | Treff ................... 226/196.1 X |
| 5,092,573 | A | * | 3/1992 | Abreu ................. 226/196.1 X |
| 5,108,022 | A | * | 4/1992 | Birkmair et al. ....... 242/615.21 |
| 5,467,179 | A | * | 11/1995 | Boeck et al. ............... 209/674 |
| 5,823,464 | A |   | 10/1998 | Bohn et al. |
| 5,829,707 | A |   | 11/1998 | Lamothe |
| 6,027,003 | A |   | 2/2000 | Gassner |
| 6,047,922 | A |   | 4/2000 | Michalik |
| 6,050,191 | A | * | 4/2000 | Enderle et al. ............. 101/222 |
| 6,092,761 | A |   | 7/2000 | Mushaben |

FOREIGN PATENT DOCUMENTS

JP            59179346       * 10/1984    .............. 242/615.2

* cited by examiner

Primary Examiner—Kathy Matecki
Assistant Examiner—Minh-Chau Pham
(74) Attorney, Agent, or Firm—McCormick, Paulding & Huber LLP

(57) ABSTRACT

Two methods for redirecting a continuous paper web with a face up orientation from a first direction to a second direction with either a face up orientation or an opposing face down orientation are provided. The directions correspond to paper processing devices such as printers and cutters, and an assembly to do the same is also provided. In the preferred embodiment of the assembly, the web passes about a turnbar that is moveable between a first and a second position. In the first position, the web is redirected face down along a second direction. In the second position, the web passes about a roller perpendicular to the second direction and is redirected along the second direction in a face up orientation.

13 Claims, 5 Drawing Sheets

TURN BAR ASSEMBLY FOR REDIRECTING A CONTINUOUS PAPER WEB

FIELD OF THE INVENTION

The present invention relates generally to a process for manipulating a continuous web of material, such as paper, film, fabric or the like, between two processing devices, such as printers, folders, cutters, or combinations of such devices. It is more particularly directed to changing the direction of web travel, changing the orientation or 'flip' (which side faces up) of the web, or both to provide proper alignment and orientation from one device into the other.

BACKGROUND OF THE INVENTION

Present day print shops employ several web processing devices in numerous combinations so as to provide custom print services over a wide variety of specifications or print jobs. The paper or other web material is typically provided on a roll that is too large and cumbersome for manual handling by a single person. Any such print job may entail using equipment such as, but not limited to web unwind and rewind machines, printers, winders, folders, cutters, etc. In order to achieve the most efficient process for a particular print job, the web must be routed from one piece of equipment to another in a continuous process line. Floor space limitations and electrical connections typically limit moving various devices into alignment, the resulting need being for the manipulation of web material between processing devices that typically remain in fixed positions relative to each other. Turnbars and rollers date to the earliest days of industrial printing to alleviate this problem. Early developments were predicated on a fixed printing need at regular intervals, such as for newspapers and magazines. There, the printing process line remained constant despite changes in text and graphics. However as the capability grows for modest sized print shops to handle numerous types of print jobs, and many processing devices exhibit more versatility, the need has arisen for adaptable methods to manipulate web material between processing devices. In the past, either a plurality of specialized turnbar assemblies needed to be retained for each combination of equipment anticipated, or a print job could not be completed in a single process and a batch process became necessary. An example of a batch process is where a print job was partially printed on a web that was then wound on a rewind roll. The rewound roll was then moved into alignment with the next processing device, and so on. As compared to a continuous process line, a batch process is time consuming, labor intensive, requires numerous rewind machines, and subjects the paper web to greater risk of tears and misalignment. One system that alleviates this problem for certain pre-positioned machinery is shown in co-owned U.S. Pat. No. 5,829,707, herein incorporated by reference. That patent is tailored to two processing devices whose control panels face each other, referred to as an "H-1" setup. The present invention seeks to overcome this particular positional limitation of machinery, simplifying processing when machinery is arranged either in an "H-1", "H-2" or an "L" configuration. The "H" configuration is the most efficient use of floor space for modest sized print shops having numerous processing devices. In the "H-1" setup, control panels of parallel machines, such as printers, face each other (and hence the printers output in different directions from each other). The "H-2" setup provides a different arrangement, where control panels on parallel machines each face the same direction (and the printers both output in the same direction). There are also a variety of shops in which devices are set up in an "L" configuration; wherein a paper web passing from one machine must be redirected 90° to properly align with another machine.

Many common print jobs are executed by passing a web between two printers. In one such job requiring printing on two sides of the paperweb, a first printer prints on one side of the web and a second printer prints on the other side. Another such job requires printing on one side only, but the first printer executes only a portion of the print (such as black and white text) and the second printer executes the remaining portion of the print (such as color highlights). This technique optimizes speed in certain print jobs since color generally prints slower than black and white but is often less pervasive on a page.

An object of the present invention is to provide a method and a sufficiently adaptable assembly for manipulating web material between processing devices so that the web will be either flipped (for two sided printing) or not (for one sided printing). A further object is to provide such a method and device that is adaptable to typical orientations of machinery, such as the "H-1", "H-2", or "L" setups. Such a method and assembly would overcome some of the obstacles outlined above that prevent modest sized print shops from realizing the full capability of their existing processing devices. An adaptable web control matrix may be made to perform similar such functions and is described in co-owned U.S. patent application Ser. No. 09/764,930, also hereby incorporated by reference.

SUMMARY OF THE INVENTION

In accordance with the present invention, a preferred method is disclosed whereby a moveable turnbar is positioned in either a first flip position or a second non-flip position, and a web is drawn from a first processing device along a first direction to pass about the turnbar. The turnbar in both the first and second positions is angled relative to this first direction. After being drawn about the turnbar, the web is then drawn about a roller if and only if the turnbar is in the second position. If the turnbar is in the first position, the roller step is omitted. Finally, the web is drawn from the turnbar or roller, as appropriate, toward a second processing device along a second direction, wherein the second direction is also angled relative to both positions of the turnbar. A longitudinal axis of the roller is substantially perpendicular to the second direction. An external tensive force, typically imposed by the second processing device draws the web.

An alternative method is also disclosed similar to that above except wherein the web is drawn first over the roller if and only if the turnbar is in the second position, and subsequently is drawn about the turnbar. If the turnbar is in the first position, the roller step is omitted as above. The longitudinal axis of the roller in this alternative method is substantially parallel to the second direction. This alternative method reflects the preferred method but wherein the web travels in the reverse direction.

The invention also comprises an assembly to manipulate web material between two processing devices, and includes a turnbar defining a longitudinal axis that is angled relative to both an input direction and an output direction for a web passing into and out of the assembly. The turnbar is moveable between a second position wherein the turnbar axis bisects an angle defined by the input and output sides, and a first position wherein the turnbar axis is substantially perpendicular to that of the second position. The assembly also includes an idler roller defining a longitudinal axis oriented substantially parallel to or perpendicular to the output direction, depending upon whether the paper web is drawn about the turnbar or the roller first. Details of the different idler roller orientations follow below.

In a particular embodiment of the invention, the turnbar is positioned in either the first or second position by distinct sets of mounting brackets, the turnbar being manually moved between the brackets. In another embodiment, the turnbar remains on a single set of mounting brackets, but the brackets and the turnbar rotate on a platform that rests in detents or locks that define either of the two positions. The idler roller is fixed relative to the input and output directions of a web passing through the turnbar/roller assembly.

DETAILED DESCRIPTION

Figure 1:
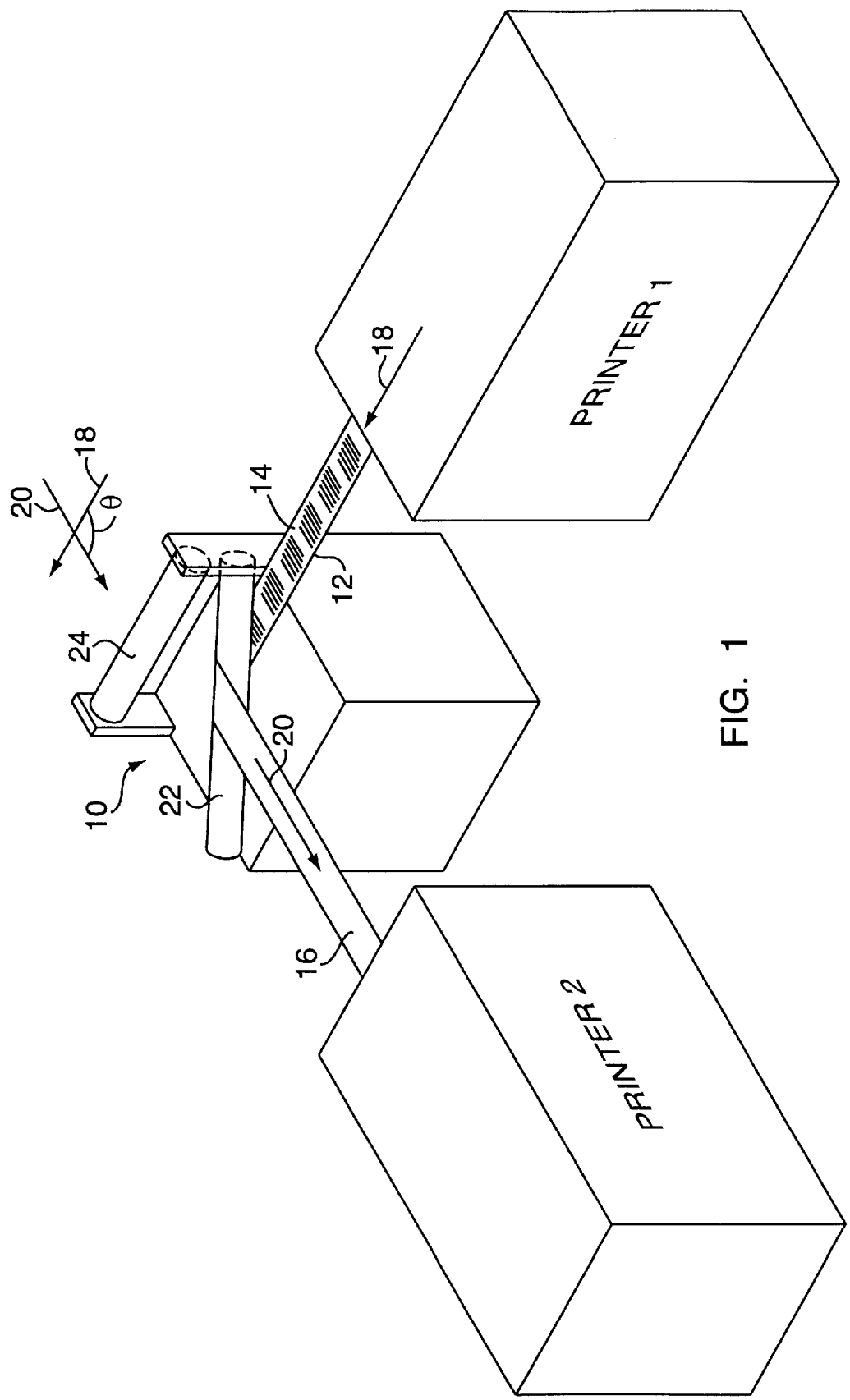
FIG. 1 is a perspective view of the preferred embodiment between two printers in an "L" setup and the turnbar in the first or flip position.
Figure 2:
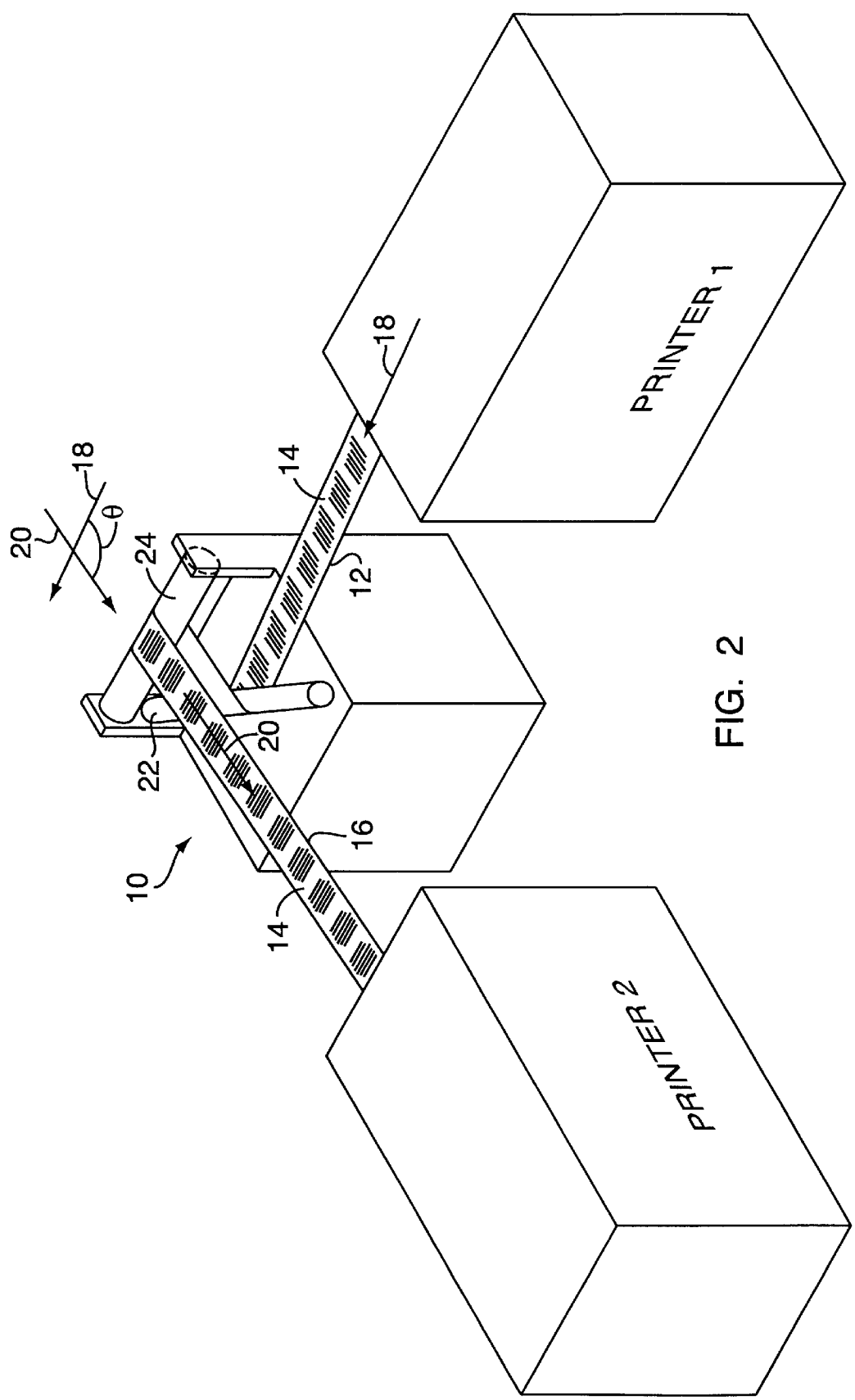
FIG. 2 is similar to FIG. 1 except the turnbar is in the second or non-flip position for one-sided printing.

Turning now to the drawings in greater detail, FIG. 1 shows the preferred embodiment of the assembly 10 in its most simple configuration. Printer 1 and Printer 2 are in an "L" setup with the assembly of the present invention between them as a web 12 would travel in the directions indicated by the arrows. Printer 1 adds text or other printed characters onto a printed side 14 of the web, the opposing virgin side 16 remaining unprinted at this point. The web 12 exits Printer 1 and enters the assembly via a first direction 18, and exits the assembly to enter Printer 2 via a second direction 20. The two directions 18 and 20 define an angle θ, shown in each of FIGS. 1–3 to be substantially 90°. (Substantially as referring to an angle is herein limited to be within 7.5° of that angle. Thus, substantially 90° includes all angles between 82.5° and 97.5°, inclusive. Similarly, an angle substantially bisecting 90° includes all angles between 37.5° and 52.5°, and an angle substantially bisecting a substantially 90° angle includes all angles between 33.75° and 56.25°.) A turnbar 22 of FIG. 1 is depicted in the first position secured to a frame 23, hereby defined as that position wherein the longitudinal axis, designated A, of the turnbar 22 is substantially perpendicular to that of a non-flip position. As shown in FIG. 2, the non-flip position is defined as that position wherein the longitudinal axis of the turnbar 22 substantially bisects the angle θ. Continuing with FIG. 1, an idler roller 24 is positioned on the frame 23 such that its longitudinal axis, designated B, is perpendicular to the second direction 20 as illustrated, but the web 12 does not engage the roller 24 in FIG. 1. Additionally, the roller axis B is at an angle β, in the horizontal, relative the turnbar axis A. The web 12 enters along the first direction 18 with web sides 14 and 16 as shown. The web 12 passes about the turnbar 22 and is simultaneously redirected toward Printer 2 and inverted so that the web sides 14 and 16 are flipped. Virgin side 16 now faces upward and printed side 14 faces downward as the web 12 passes out of the assembly along the second direction 20. The web is oriented such that Printer 2 can print on virgin side 16 and the resulting web will be printed on both sides 14 and 16.

FIG. 2 shows how the same web 12 can be re-routed through the assembly 10 for printing on only one side of the web by each of Printer 1 and Printer 2. The turnbar 22 is repositioned to substantially bisect the angle θ, denoted as the non-flip position. Printer 1 prints on the same printed side 14 of the web as in FIG. 1, but the web is directed away from Printer 2 after passing about the turnbar 22 when the turnbar 22 is in this non-flip position, or alternatively as the second position. The first and second positions are mutually exclusive, meaning that a turnbar 22 cannot be in both positions at one time. The web next passes about the idler roller 24, which simultaneously redirects the web toward Printer 2 and inverts it so that the printed side 14 returns to an upward facing orientation. Thus, printed side 14 faces upward upon entering the assembly along the first direction 18 and upon exiting the assembly along the second direction 20. The web enters Printer 2 for further printing on the same side as Printer 1, allowing a different type of print job from that of FIG. 1.

Figure 3:
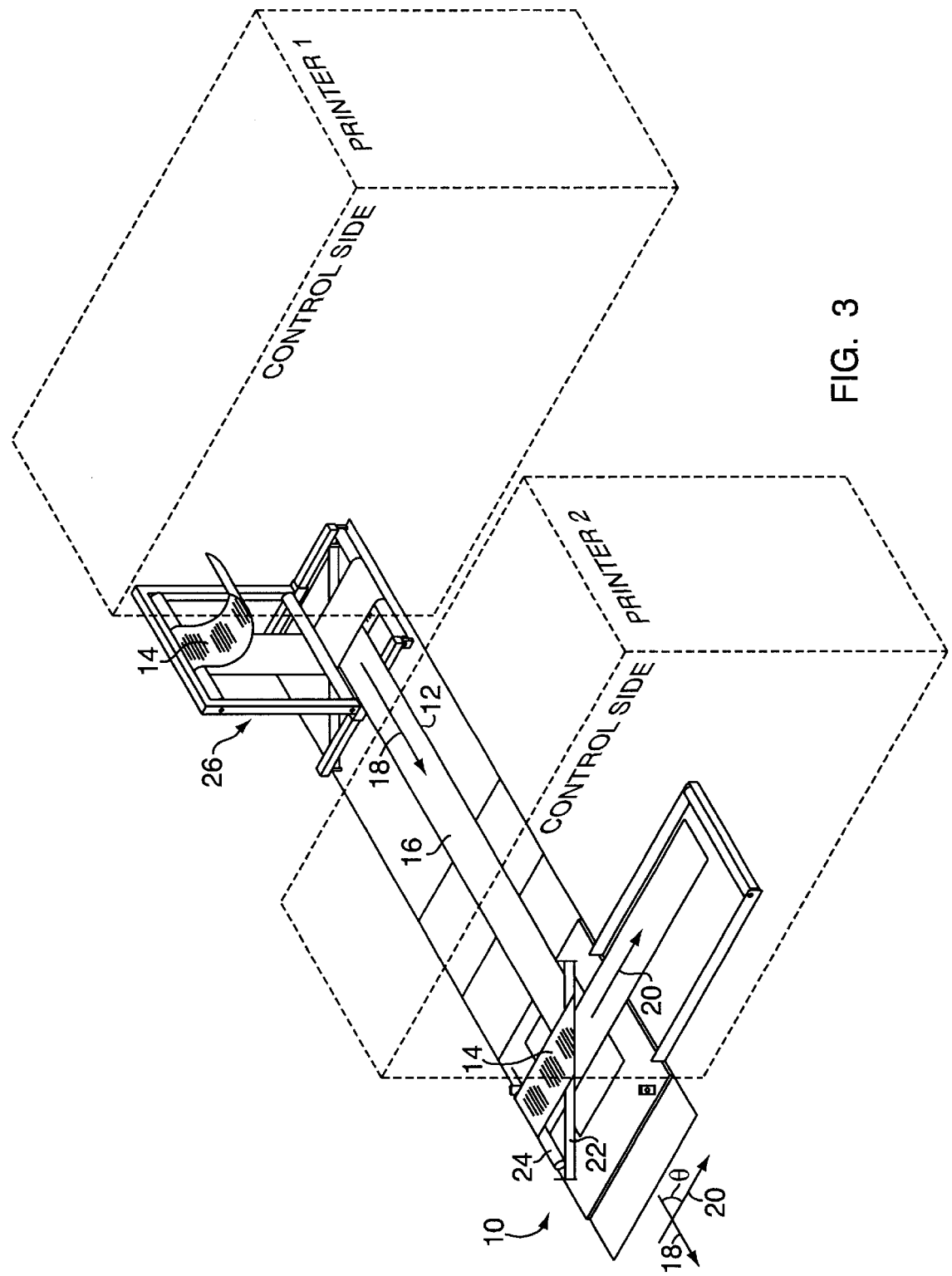
FIG. 3 shows the preferred embodiment between two printers in an "H-2" setup and the turnbar in the second or non-flip position.

FIG. 3 shows Printers 1 and 2 in an H-2 arrangement, that is, side by side with the output side of each printer facing in the same direction, away form the viewer as depicted. The web 12 travels from Printer 1 through the tower 26 along a first direction 18 and into the assembly 10, passing out via a second direction 20 toward into Printer 2. Though the input side of Printer 2 mirrors that of Printer 1 and is nearest the viewer of FIG. 3, the web 12 enters Printer 2 in this particular arrangement from an alternative entryway underneath the printer, typical of commercial printers. The web 12 may also be routed to enter from the input side nearest the viewer by employing additional rollers.

Figure 5:
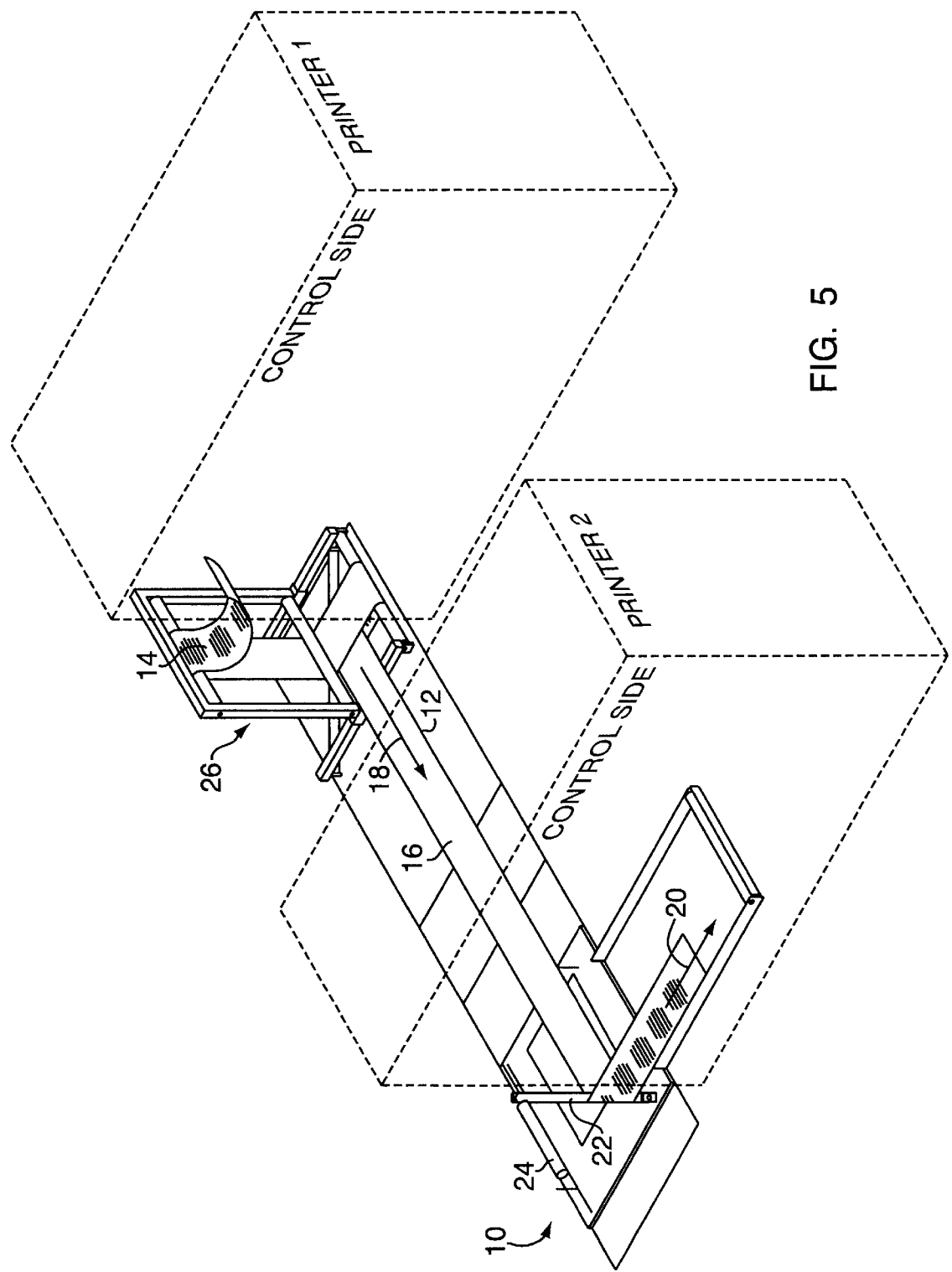
FIG. 5 is similar to FIG. 3, showing the turnbar in the first position.

The web 12 is printed on printed side 14 and passes through a tower 26, such as is described in U.S. Pat. No. 5,829,707 and incorporated by reference. The tower 26 re-directs the web laterally and nearer the ground so that an operator may easily walk over a bridge (not shown) when moving between the control panels of either printer without interrupting the flow of the web 12. This particular tower 26 inverts the web 12 so that the printed side 14 faces downward after passing through the tower 26. The web 12 then enters the assembly 10 along the first direction 18, passes about the turnbar 22 in the non-flip position, and is inverted so that the printed side 14 faces upward. The web 12 subsequently passes about the idler roller 24 where it is redirected toward Printer 2 and inverted again so that the virgin side 16 faces upward, exiting the assembly along the second direction 20. The web then is manipulated via rollers to enter Printer 2 from the bottom (as shown) or the input side nearest the viewer. FIG. 5 depicts the assembly 10 between an H-2 configuration of Printers 1 and 2, but with the turnbar 22 in the first position similar to that of FIG. 2 where the printers are in an L configuration. In this way, the assembly 10 may be adapted to either the H-1 or H-2 arrangement of equipment.

Figure 4:
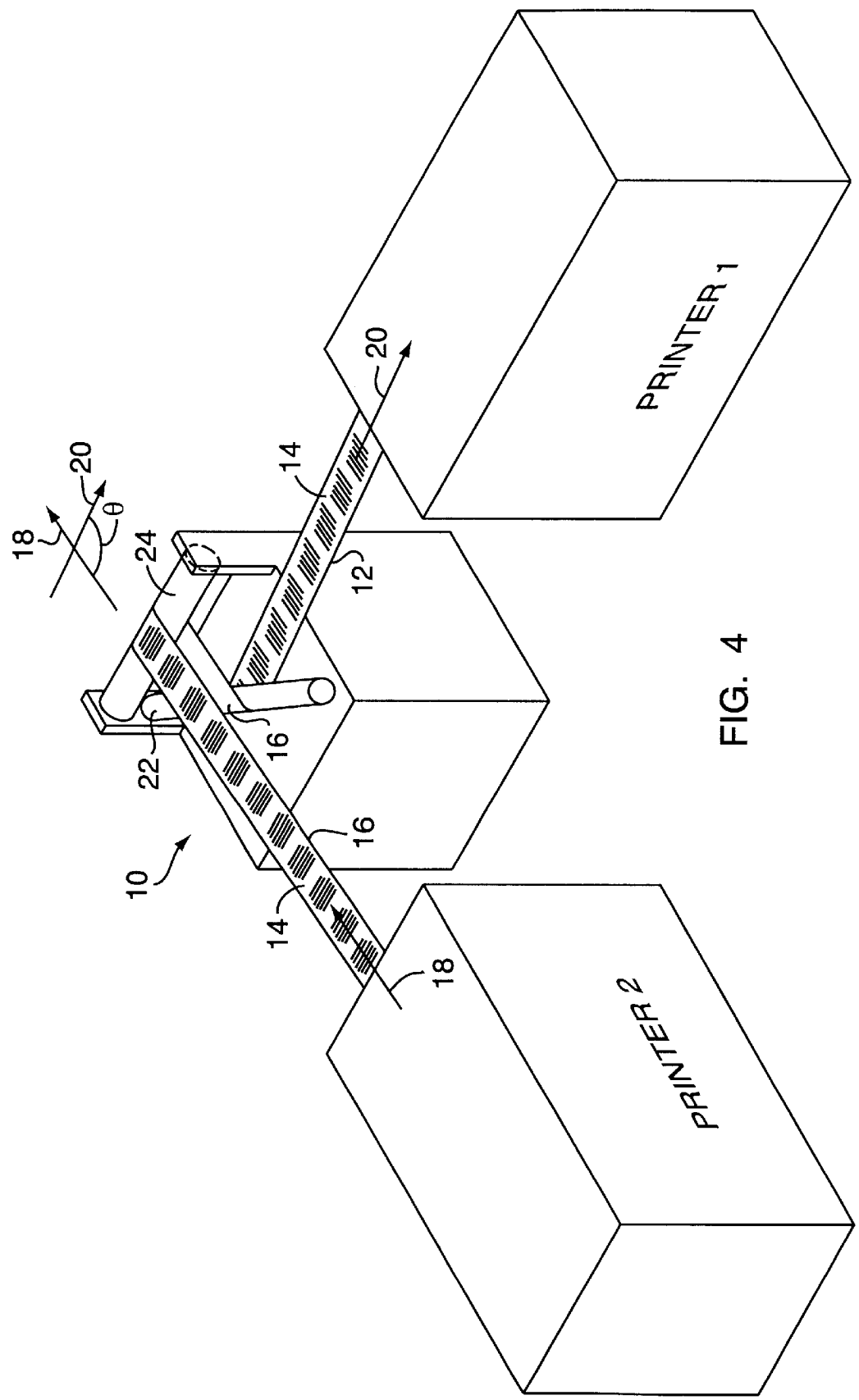
FIG. 4 is similar to FIG. 2 except the web travels in reverse, passing about the roller prior to the turnbar.

It will be appreciated that the web may be threaded through the assembly in reverse, so that a web passes about the idler roller 24 prior to passing about the turnbar 22. This is shown in FIG. 4. In that case, the first and second directions are reversed as compared to those in FIG. 2. Operation of the device and method is a mirror reflection to that discussed above. This mirror arrangement is within certain of the ensuing claims, and the public is hereby put on notice that such reverse threading of a web through the assembly is an equivalent of the preferred embodiment and method.

Additionally, two turnbars in separate horizontal planes may be imposed wherein one lies in the flip position and the other lies in the non-flip position, the web passing about either the flip position turnbar or both the non-flip position turnbar and the roller. This is considered an equivalent to a roller moveable between a flip and a non-flip position since the web passes about only one of the turnbars in a single pass through the assembly.

The longitudinal axis of the turnbar and that of the roller may lie in the same horizontal plane, as generally depicted in FIG. 3. Alternatively, they may lie in distinct horizontal planes as shown in FIGS. 1–2. The particular wrap of the web about the turnbar and roller (either passing from over to under as shown about the roller of FIG. 3, or under to over as shown about the turnbar of FIG. 3) is dictated in certain embodiments by the horizontal arrangement of these longitudinal axes. Several of the ensuing claims employ the term 'substantial angle' between the first and second direction. A substantial angle is hereby defined as any angle within 45° of the perpendicular.

I claim:

1. An assembly for redirecting paper web material from a first direction with a face up orientation to a second direction with either a face up or face down orientation, wherein the directions define a substantially perpendicular angle between them, comprising:
    a turnbar positioned in a pathway of a web travelling along said first and second directions, said turnbar moveable between a second position wherein a longitudinal axis of said turnbar substantially bisects said angle between said first and second directions, and a first position that is substantially perpendicular to said second position;
    a roller having a longitudinal axis that is aligned substantially perpendicular to either said first or said second direction;
    such that the web from the first direction with the first orientation passing about said turnbar in the second position is redirected to the second direction with the opposing orientation; and
    such that the web from the first direction with the first orientation passing about both of said turnbar in the second position and said roller is redirected to the second direction with the first orientation.

2. An apparatus for turning, or turning and flipping a continuous web entering the apparatus in one direction and exiting in another, the apparatus comprising:
    a frame,
    a roller secured to the frame; and
    a turnbar releasably securable in a first position to the frame at a first angle relative to the roller and in a second position to the frame at a second angle relative to the roller wherein the turnbar in the first position turns and flips the continuous web and in the second position cooperates with the roller to turn but not to flip the continuous web and the entering direction and the exiting direction for the continuous web from the apparatus are the same for both positions.

3. The apparatus of claim 2 wherein the turnbar has an axis and the axis in the first and second positions are generally in a plane and oriented in opposite angular relationship to the entering direction.

4. The apparatus of claim 2 wherein the turnbar has an axis and the roller has an axis and the turnbar axis and the roller axis are not in a plane when the turnbar is secured in the first or second position.

5. The apparatus of claim 2 wherein there is a vertical gap between the roller and the secured turnbar.

6. The apparatus of claim 5 wherein the roller is higher than the secured turnbar.

7. The apparatus of claim 2 wherein the first and second positions are spatially mutually exclusive.

8. An apparatus for turning, or turning and flipping a continuos web entering the apparatus in a given direction and exiting in another, the apparatus comprising:
    a frame rotatable from one position to another position relative to the given direction,
    a roller secured to the frame; and
    a turnbar secured to the frame at an angle relative to the roller
    whereby the frame in one position places the turnbar at an angle relative to the given direction of the web such that the turnbar alone turns and flips the continuous web and in the other position places the turnbar at an angle relative the given direction such that the turnbar and roller cooperate to turn and not flip the continuous web and the entering direction and the exiting direction for the continuous web from the apparatus are the same for both positions.

9. The apparatus of claim 8 wherein the turnbar has an axis and the axis in the first and second positions are generally in a plane.

10. The apparatus of claim 8 wherein the turnbar has an axis and the roller has an axis and the turnbar axis and the roller axis are not in a plane when the turnbar is secured in the first or second position.

11. The apparatus of claim 8 wherein there is a vertical gap between the roller and the secured turnbar.

12. The apparatus of claim 11 wherein the roller is higher than the secured turnbar.

13. The apparatus of claim 8 wherein the first and second positions are spatially mutually exclusive.

* * * * *